(12) United States Patent
Chiu

(10) Patent No.: US 7,254,822 B2
(45) Date of Patent: Aug. 7, 2007

(54) DISK DRIVE AVOIDING FLYING DISK

(75) Inventor: Yi-Ling Chiu, Kao-Hsiung (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 416 days.

(21) Appl. No.: 10/710,839

(22) Filed: Aug. 5, 2004

(65) Prior Publication Data

US 2005/0055707 A1 Mar. 10, 2005

(30) Foreign Application Priority Data

Aug. 7, 2003 (TW) .............................. 92121717 A

(51) Int. Cl.
G11B 17/028 (2006.01)
G11B 19/20 (2006.01)

(52) U.S. Cl. ...................... 720/707; 720/710

(58) Field of Classification Search ................ 720/604, 720/706, 707, 710, 714
See application file for complete search history.

(56) References Cited

U.S. PATENT DOCUMENTS

| | | | |
|---|---|---|---|
| 4,562,570 A | 12/1985 | Denton | |
| 5,323,379 A * | 6/1994 | Kim | ........................... 720/707 |
| 6,392,317 B1 | 5/2002 | Hall et al. | |
| 6,670,880 B1 | 12/2003 | Hall et al. | |
| 6,717,501 B2 | 4/2004 | Hall et al. | |
| 6,799,632 B2 | 10/2004 | Hall et al. | |
| 6,821,147 B1 | 11/2004 | Hall et al. | |
| 6,830,467 B2 | 12/2004 | Hall et al. | |
| 6,844,498 B2 | 1/2005 | Hall et al. | |
| 6,888,473 B1 | 5/2005 | Hall et al. | |
| 6,913,093 B2 | 7/2005 | Hall et al. | |
| 6,929,493 B2 | 8/2005 | Hall et al. | |
| 6,945,802 B2 | 9/2005 | Hall et al. | |
| 2002/0191531 A1* | 12/2002 | Yeh et al. | ................... 369/270 |
| 2005/0001735 A1 | 1/2005 | Hall et al. | |
| 2005/0115717 A1 | 6/2005 | Hall et al. | |
| 2005/0145406 A1 | 7/2005 | Hall et al. | |
| 2005/0150653 A1 | 7/2005 | Hall et al. | |
| 2005/0161215 A1 | 7/2005 | Hall et al. | |
| 2005/0173128 A1 | 8/2005 | Hall et al. | |
| 2005/0212530 A1 | 9/2005 | Hall et al. | |
| 2005/0236160 A1 | 10/2005 | Hall et al. | |

FOREIGN PATENT DOCUMENTS

| | | | | |
|---|---|---|---|---|
| JP | 58133682 A | * | 8/1983 | |
| JP | 05234206 A | * | 9/1993 | |
| JP | 06243562 A | * | 9/1994 | |
| JP | 10064147 A | * | 3/1998 | |
| JP | 11353749 A | * | 12/1999 | |
| JP | 2000100031 A | * | 4/2000 | |
| JP | 2000163837 A | * | 6/2000 | |
| JP | P2000-268459 A | | 9/2000 | |
| JP | 2002334496 A | * | 11/2002 | |

* cited by examiner

*Primary Examiner*—William J Klimowicz
(74) *Attorney, Agent, or Firm*—Winston Hsu

(57) ABSTRACT

An optical disk drive includes a base for holding an optical disk, a protrusion protruding out from the base that extends through the center hole of the optical disk when holding the optical disk, and at least one hook rotatably installed on the protrusion. When the disk drive stops, the hook is retracted to within the edge of the protrusion and when disk is rotated up to a predetermined speed, the hook extends out from the edge of the protrusion to hook the optical disk.

8 Claims, 9 Drawing Sheets

| Rotation speed | Reading factor | Centrifugal force(Unit) | Centrifugal moment (Unit : N*mm) |
|---|---|---|---|
| 1000rpm | 4.8X | 0.017N | 0.027 |
| 3000rpm | 14.5X | 0.146N | 0.228 |
| 5000rpm | 24X | 0.401N | 0.626 |
| 7000rpm | 33.8X | 0.797N | 0.243 |
| 9000rpm | 43.5X | 1.311N | 2.045 |
| 10500rpm | 52X | 1.784N | 2.783 |

Fig. 9

DISK DRIVE AVOIDING FLYING DISK

BACKGROUND OF INVENTION

1. Field of the Invention

The invention relates to an optical disk drive, and more particularly, to an optical disk drive for avoiding the event of a flying disk.

2. Description of the Prior Art

Optical disks have become one of the most important storage media in modern society because of their compact size, low cost, and high storage capacity. Optical disks are played by optical disk drives. An optical disk is fixed by a holder in an optical disk drive and rotated so that a pickup head of the drive can search for data on the disk. During high speed rotation, the optical disk may no longer be strictly fixed on its position due to vibration or shock to the drive in an event that is called a "flying disk". To prevent a flying disk event, a typical disk drive uses a magnetic holder to hold the disk.

Please refer to FIG. 1 showing a conventional optical disk drive 10 using a magnetic holder. The disk drive 10 includes a holder 12, a tray 14, a protrusion 16, a turn table 18, and a motor 20. The holder 12 is movably installed on the upper part of the disk drive, the tray 14 is movably installed between the holder 12 and the turn table 18, the protrusion 16 includes a magnet 24, the motor 20 is installed under the turn table 18, and an optical disk 22 is put on the tray 14. When reading the disk 22, the turn table 18 pushes the disk 22 up so that the disk 22 is brought up from the tray 14 and clipped between the turn table 18 and the holder 12, and then the motor 20 rotates the turn table 18 for a pickup head of the disk drive 10 to read the disk 22. The holder 12 is made of metal and installed above the tray 14 for clipping the disk 22 in cooperation with the turn table 18.

To repeat, when reading the disk 22, the turn table 18 goes up to bring the disk 22 up from the tray 14 and clip the disk 22 in cooperation with the holder 12; at this moment the magnet 24 included in the protrusion 16 on the turn table 18 becomes close enough to the holder 12 so that the holder 12, which is made of metal, is attracted downwards by the magnet 24, strictly clipping the disk 22. By moving the magnet 24 up and down, the holder 12 can be controlled to adhere to or depart from the turn table 18.

As described above, the prior art installs the magnet 24 in the protrusion 16 to attract the holder 12 in order to adhere the holder 12 to the turn table 18 so that the holder 12 and the turn table 18 can strictly clip the disk 22 to prevent flying disk due to shock and collision during high speed rotation. However, the attraction of the magnet decreases as the temperature increases. As the temperature increases, the attraction of the magnet may decrease to the point where it can no longer attract the turn table 18. In this case, the possibility of a flying disk event occurring is strong.

SUMMARY OF INVENTION

It is therefore a primary objective of the claimed invention to provide an optical disk drive for avoiding the event of a flying disk in order to solve the problems mentioned above.

Briefly, an optical disk drive includes a base for holding an optical disk, a protrusion protruding out from the base that extends through the center hole of the optical disk when holding the optical disk, and at least one hook rotatably installed on the protrusion. When the disk drive stops, the hook is retracted within the edge of the protrusion, and when disk is rotated up to a predetermined speed, the hook extends out from the edge of the protrusion to hook the optical disk.

The present invention further provides an optical disk drive including a base for holding an optical disk, a protrusion protruding out from the base that extends through the center hole of the optical disk when holding the optical disk, and at least one hook slidably installed on the protrusion. When the disk drive stops, the hook is retracted to within the edge of the protrusion and when disk is rotated up to a predetermined speed, the hook extends out from the edge of the protrusion to hook the optical disk.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 9 is a list of rotation speeds and their corresponding centrifugal force.

DETAILED DESCRIPTION

Figure 1:
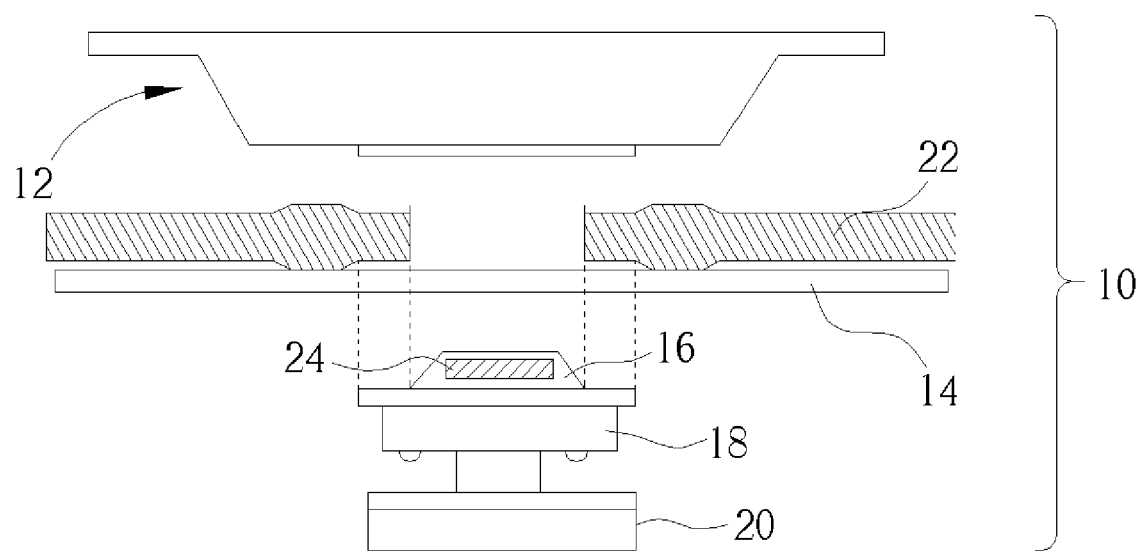
FIG. 1 illustrates a conventional optical disk drive using a magnetic holder.
Figure 2:
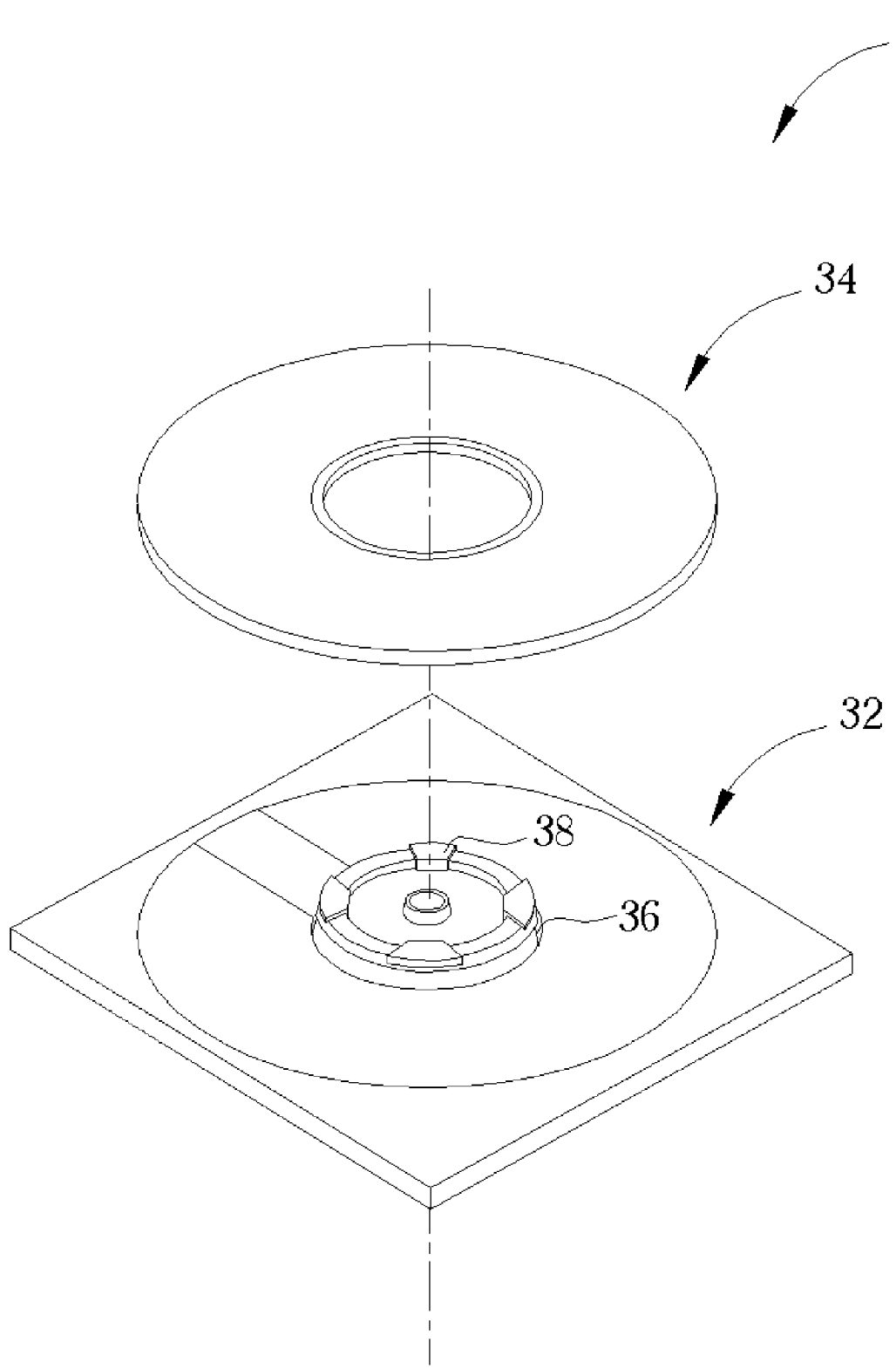
FIG. 2 illustrates an optical disk drive according to the present invention.
Figure 3:
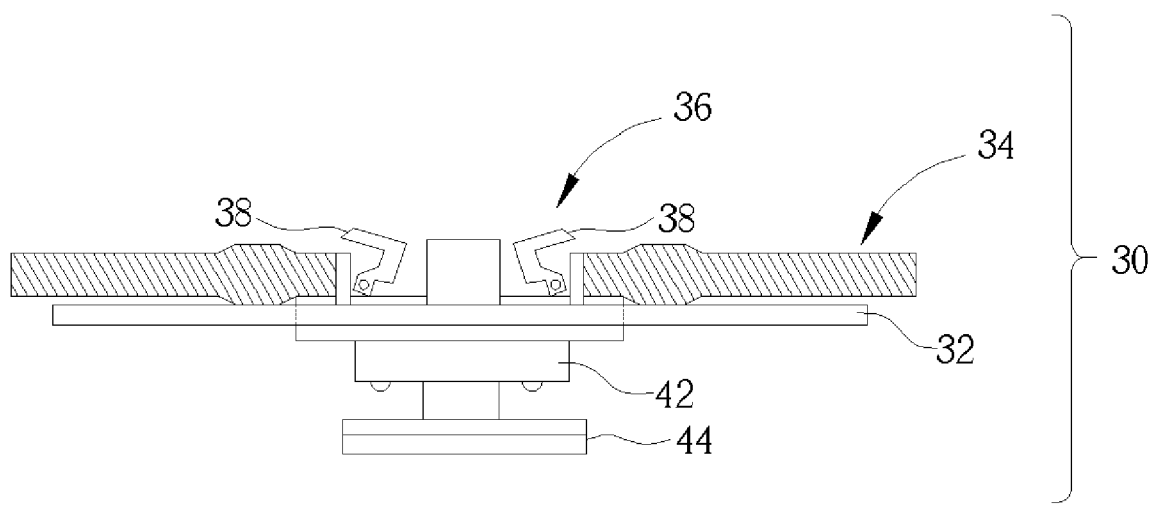
FIG. 3 illustrates the optical disk drive in low speed rotation or a stop mode according to the first embodiment of the present invention.
Figure 4:
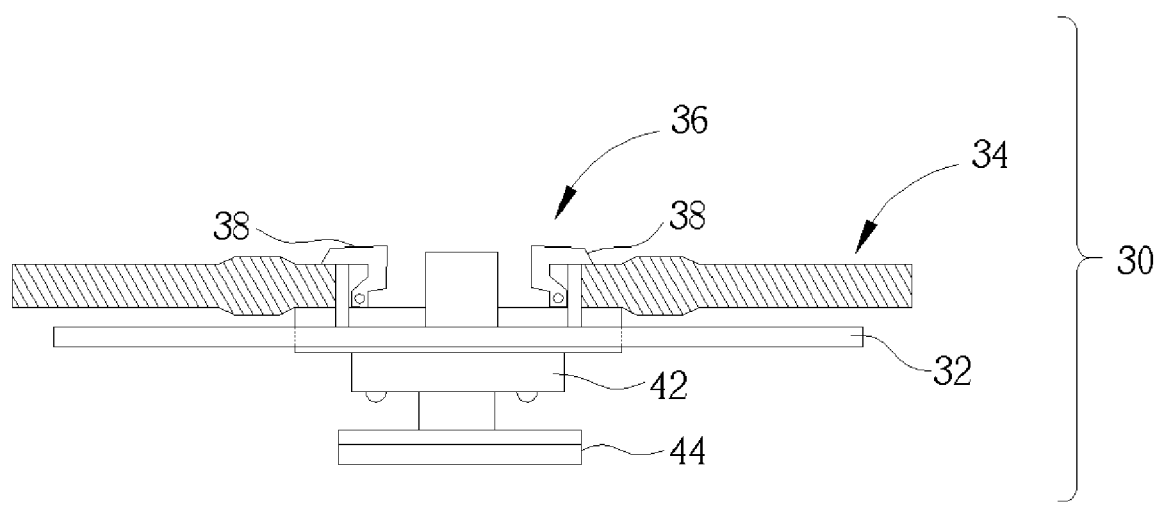
FIG. 4 illustrates the optical disk drive in high speed rotation or to the first embodiment of the present invention.

Please refer to FIG. 2 showing an optical disk drive 30 according to the present invention, FIG. 3 showing the optical disk drive 30 in low speed rotation or a stop mode, and FIG. 4 showing the optical disk drive 30 in high speed rotation, all of which are according to the first embodiment of the present invention. The disk drive 30 includes a base 32, a protrusion 36, and a plurality of hooks 38. The base 32 is for holding an optical disk 34, the protrusion 36 protrudes from the base 32 that can hold the disc 34 by extending through the center hole of the disk 34, and each hook 38 is rotatably installed on the protrusion 36. The base 32 is a tray slidably installed in the housing of the disk drive 30. The disk drive 30 further includes a motor 44 and a turn table 42. The motor 44 rotates the turn table 42 so that a pickup head of the disk drive 30 can read the disk 34. During low speed rotation or a stop mode, the hooks 38 are retracted to within the edge of the protrusion 36, and when the turn table 42 rotates up to a predetermined speed, the hooks 38 are extended out from the protrusion 36 in order to hook the disk. When the disk drive 30 reads the disk 34, the turn table 42 pushes the disk 34 up from the base 32, and then the motor 44 drives the turn table 42 to rotate the disk 34. During low speed rotation or a stop mode, the hooks 38 are retracted to within the edge of the protrusion 36 due to gravity so that they will not hook the disk. And as shown in FIG. 4, during high speed rotation, by the centrifugal force gained by rotation, the hooks 38 extend out from the edge of the protrusion 36 to hook the disk 34. In such a manner the hooks 38 and the turn table 42 clip the rotating disk 34 so that a flying disk event can be prevented by the hooks 38 even when the disk drive 30 is shocked or vibrated. Please notice that the operation and the movement of the turn table 42 when reading the disk 34 is well known by the person skilled in the art so that a further description is hereby omitted. Moreover, FIG. 3 actually only shows the stop mode. In low speed rotation, the turn table 42 pushes the disk 34 up as shown in FIG. 4; however, the hooks 38 are not provided sufficient centrifugal force to extend out from the protrusion 36 since the rotation is in low speed. Such a feature is not shown in FIG. 3.

Figure 5:
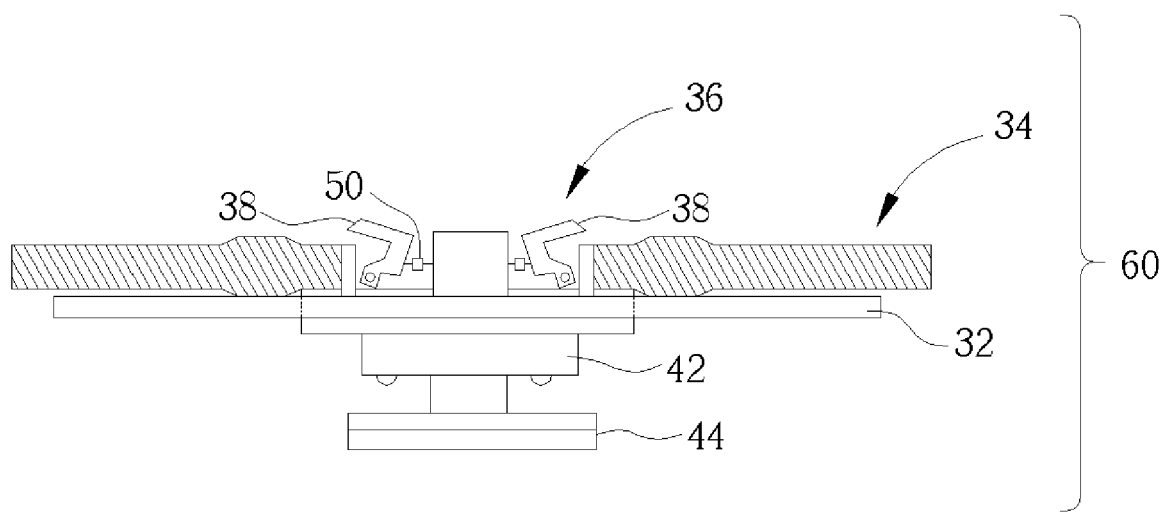
FIG. 5 illustrates the optical disk drive in low speed rotation or a stop mode according to the second embodiment of the present invention.
Figure 6:
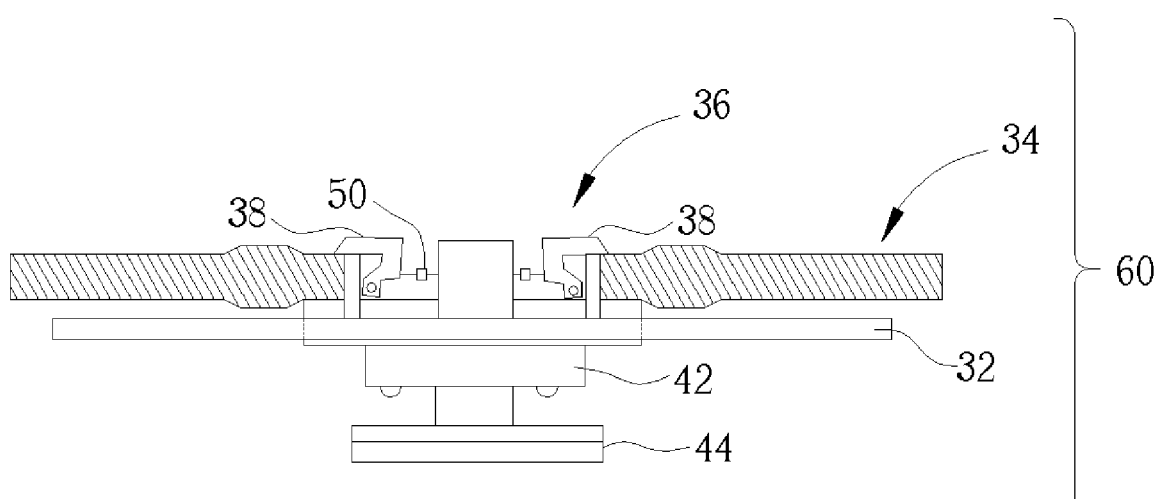
FIG. 6 illustrates the optical disk drive in high speed rotation or to the second embodiment of the present invention.

Please refer to FIG. 5 showing an optical disk drive 60 in low speed rotation or a stop mode, and FIG. 6 showing the optical disk drive 60 in high speed rotation, both of which are according to the second embodiment of the present invention. The disk drive 60 includes a base 32, a protrusion 36, and a plurality of hooks 38. The base 32 is for holding an optical disk 34, the protrusion 36 protrudes from the base 32 that can hold the disc 34 by extending through the center hole of the disk 34, and each hook 38 is rotatably installed on the protrusion 36. The base 32 is a tray slidably installed in the housing of the disk drive 60. The disk drive 60 also includes a motor 44 and a turn table 42. The motor 44 rotates the turn table 42 so that a pickup head of the disk drive 60 can read the disk 34. The disk drive 60 further includes at least one elastic component 50 connected respectively between a hook 38 and the center of the protrusion 36. When the disk drive 60 reads the disk 34, the turn table 42 pushes the disk 34 up from the base 32, and then the motor 44 drives the turn table 42 to rotate the disk 34. During low speed rotation or a stop mode, the elastic components 50 retract each connected hook 38 to within the edge of the protrusion 36 by its elasticity so that they will not hook the disk. And as shown in FIG. 6, during high speed rotation, by the centrifugal force gained by rotation, the hooks 38 are no longer retracted by the elastic components 50 and extend out from the edge of the protrusion 36 to hook the disk 34. In such a manner the hooks 38 and the turn table 42 clip the rotating disk 34 so that a flying disk event can be prevented by the hooks 38 even when the disk drive 30 is shocked or vibrated. Please notice that the operation and the movement of the turn table 42 when reading the disk 34 is well known by the person skilled in the art so that a further description is hereby omitted. Moreover, FIG. 5 actually only shows the stop mode. In low speed rotation, the turn table 42 pushes the disk 34 up as shown in FIG. 6; however, the hooks 38 are not provided sufficient centrifugal force to extend out from the protrusion 36 since the rotation is in low speed. Such a feature is not shown in FIG. 5.

As for the third embodiment of the present invention, please refer to FIG. 3 and FIG. 4. The third embodiment of the present invention has the same structure as the first embodiment, so that a further description is hereby omitted. However, the different between the two is that the hooks 38 are made of metal or magnet and the protrusion 36 includes a magnet (not shown) to attract the hooks 38. When the disk drive 60 reads the disk 34, the turn table 42 pushes the disk 34 up to bring the base 32, and then the motor 44 drives the turn table 42 to rotate the disk 34. During low speed rotation or a stop mode, the magnet retracts each connected hook 38 to within the edge of the protrusion 36 via magnetic attraction so that they will not hook the disk. And as shown in FIG. 6, during high speed rotation, with the centrifugal force gained by rotation, the hooks 38 are no longer held back by the magnet and as a result, extend out from the edge of the protrusion 36 to hook the disk 34. In such a manner the hooks 38 and the turn table 42 clip the rotating disk 34 so that flying disk can be further prevented by the hooks 38 even when the disk drive 30 is shocked or vibrated. Please notice that the operation and the movement of the turn table 42 when reading the disk 34 is well known by the person skilled in the art, so that a further description is hereby omitted. Moreover, FIG. 3 actually only shows the stop mode. In low speed rotation, the turn table 42 pushes the disk 34 up as shown in FIG. 4; however, the hooks 38 are not provided sufficient centrifugal force to extend out from the protrusion 36 since the rotation is in low speed. Such a feature is not shown in FIG. 3.

Figure 7:
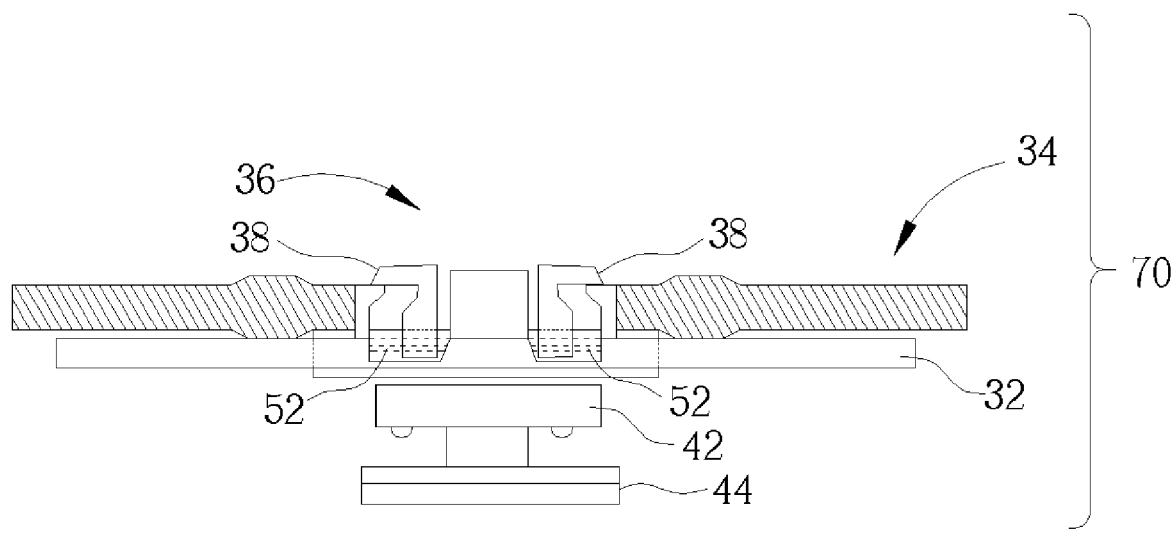
FIG. 7 illustrates the optical disk drive in low speed rotation or a stop mode according to the fourth embodiment of the present invention.
Figure 8:
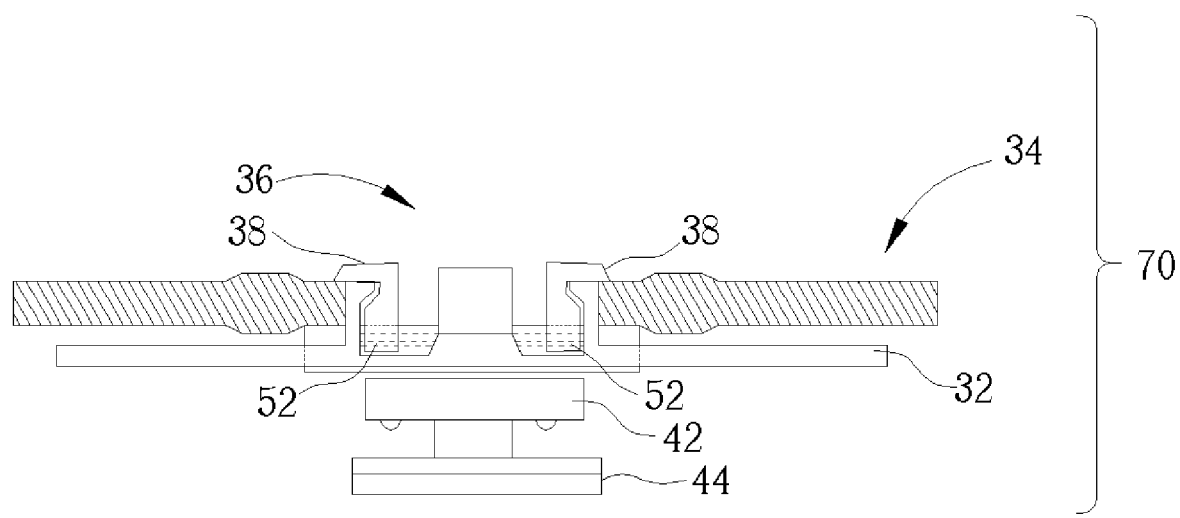
FIG. 8 illustrates the optical disk drive in high speed rotation to the fourth embodiment of the present invention.

Please refer to FIG. 7 showing an optical disk drive 70 in low speed rotation or a stop mode and FIG. 8 showing the optical disk drive 70 in high speed rotation, both of which are according to the fourth embodiment of the present invention. The disk drive 70 includes a base 32, a protrusion 36 and a plurality of hooks 38. The base 32 is for holding an optical disk 34, the protrusion 36 protrudes from the base 32 that can hold the disc 34 by extending through the center hole of the disk 34. The disk drive 70 further includes a sliding track 52 for the hooks 38 to slide along. The disk drive 70 further includes a motor 44 and a turn table 42. The motor 44 rotates the turn table 42 so that a pickup head of the disk drive 60 can read the disk 34. The protrusion 36 further includes a magnet (not shown) to attract the hooks 38. When the disk drive 70 reads the disk 34, the turn table 42 pushes the disk 34 up from the base 32, and then the motor 44 drives the turn table 42 to rotate the disk 34. During low speed rotation or a stop mode, the magnet retracts each connected hook 38 to within the edge of the protrusion 36 via magnetic attraction so that they will not hook the disk. And as shown in FIG. 8, during high speed rotation, by the centrifugal force gained by rotation, the hooks 38 move along the sliding track 52 to extend out from the edge of the protrusion 36 to hook the disk 34. In such a manner the hooks 38 and the turn table 42 clip the rotating disk 34 so that a flying disk event can be prevented by the hooks 38 even when the disk drive 30 is shocked or vibrated. In addition to the magnet mentioned above, elastic components can also be used in place of the magnet to attract the hooks. Please notice that the operation and the movement of the turn table 42 when reading the disk 34 is well known by the person skilled in the art so that a further description is hereby omitted. Moreover, FIG. 7 actually shows only the stop mode. In low speed rotation, the turn table 42 pushes the disk 34 up as shown in FIG. 8; however, the hooks 38 are not provided sufficient centrifugal force to extend out from the protrusion 36 since the rotation is in low speed. Such a feature is not shown in FIG. 7

Please refer to FIG. 9 showing a of rotation speeds and their corresponding centrifugal forces. According to the present invention, each hook weighs 7.975 g net, and when extending out from the edge of the protrusion, the arm of force is ca. 1.447 mm. A flying disk event occurs only during high speed rotation, which according to the industry is defined as anything above 6000 rpm. The hooks according to the present invention are required to hook the disk during high speed rotation. Thus as shown in FIG. 9, between 5000 rpm and 7000 rpm, the hooks are not bounded or attracted by the elastic components or the magnet in order to hook the disk. The hooks extended at the farthest point from its center of gravity require a moment of ca. 0.113N*mm. Therefore, at 6000 rpm, if each hook obtains a centrifugal moment of 0.7N*mm, the elastic components or the magnet is required to provide a moment of 0.41N*mm, in order to make the hooks extend out from the protrusion to clip the disk during high speed rotation.

FIG. 9 is only an example of the present invention that does not limit the range of the present invention. Of course, hooks in different shapes, weight, or made of different materials also belong to the present invention.

In contrast to the prior art, the present invention provides a means avoiding a flying disk event in the optical disk drive, which includes the protrusion and at least one hook so that during low speed rotation or a stop mode, the hooks are retracted to within the edge of the protrusion and thereby leaving from the disk by its own weight or bounded or attracted by the elastic component or the magnet. And during high speed rotation, by the centrifugal force gained by rotation, each hook is no longer bounded and extends out from the protrusion to hook the disk. In such a manner, a flying disk event due to shock or collision to the disk drive can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical disk drive for driving an optical disk, wherein the optical disk has a center hole, the optical disk drive comprising:
    a base for holding the optical disk;
    a protrusion protruding out from the base for that extends through the center hole when carrying the optical disk; and
    at least one hook rotatably installed on the protrusion;
    wherein the hook is a magnetic hook, and the protrusion further comprises a magnet to attract the hook,
    wherein when the disk drive stops, the hook is retracted by the attractive force of the magnet to within the edge of the protrusion and when disk is rotated up to a predetermined speed, the hook extends out from the edge of the protrusion to hook the optical disk.

2. The device of claim 1 wherein in low speed rotation or a stop mode, the magnet retracts the hook to within the edge of the protrusion by magnetic attraction to have the hook leave from the optical disk.

3. The device of claim 1 wherein in high speed rotation, the hook rotates and extends out to hook the optical disk by the centrifugal force obtained by the rotation.

4. The device of claim 1 wherein the base is a tray slidably installed in a housing of the optical disk drive.

5. An optical disk drive for driving an optical disk, wherein the optical disk has a center hole, the optical disk drive comprising:
    a base for holding the optical disk;
    a protrusion protruding out from the base that extends through the center hole of the optical disk when carrying the optical disk, the protrusion comprising a magnet; and
    at least one hook slidably installed on the protrusion, wherein the hook is magnetic and is attracted to the magnet of the protrusion,
    wherein when the disk drive stops, the hook is retracted to within the edge of the protrusion and when disk is rotated up to a predetermined speed, the hook extends out from the edge of the protrusion to hook the optical disk.

6. The device of claim 5 wherein in low speed rotation or a stop mode, the magnet retracts the hook to within the edge of the protrusion by magnetic attraction to have the hook leave from the optical disk.

7. The device of claim 5 wherein in high speed rotation, the hook slides and extends out to hook the optical disk by the centrifugal force obtained by the rotation.

8. The device of claim 5 wherein the base is a tray slidably installed in a housing of the optical disk drive.

* * * * *